US009053688B2

(12) United States Patent
Yoshikawa

(10) Patent No.: US 9,053,688 B2
(45) Date of Patent: Jun. 9, 2015

(54) BASE FOR TABLET COMPUTER PROVIDING INPUT/OUPUT MODULES

(71) Applicant: Yoshinari Yoshikawa, Los Altos, CA (US)

(72) Inventor: Yoshinari Yoshikawa, Los Altos, CA (US)

(73) Assignee: Miselu, Inc., San Francisco, CA (US)

( * ) Notice: Subject to any disclaimer, the term of this patent is extended or adjusted under 35 U.S.C. 154(b) by 91 days.

(21) Appl. No.: 13/841,024

(22) Filed: Mar. 15, 2013

(65) Prior Publication Data

US 2014/0260908 A1 Sep. 18, 2014

(51) Int. Cl.

| | |
|---|---|
| ***G10H 1/32*** | (2006.01) |
| ***G01H 3/00*** | (2006.01) |
| ***G10H 1/00*** | (2006.01) |
| ***G10H 5/00*** | (2006.01) |

(52) U.S. Cl.

CPC . *G10H 1/00* (2013.01); *G10H 5/00* (2013.01); *G10H 1/32* (2013.01); *G10H 2220/096* (2013.01); *G10H 2230/015* (2013.01)

(58) Field of Classification Search

USPC .................................................... 84/721, 746

See application file for complete search history.

(56) References Cited

U.S. PATENT DOCUMENTS

| | | | | |
|---|---|---|---|---|
| 5,971,635 | A * | 10/1999 | Wise | 400/473 |
| 6,215,055 | B1 * | 4/2001 | Saravis | 84/422.1 |
| 7,247,788 | B2 * | 7/2007 | Lai | 84/719 |
| 7,326,849 | B2 * | 2/2008 | Adams et al. | 84/746 |
| 7,786,371 | B1 * | 8/2010 | Moates | 84/645 |
| 8,158,875 | B2 * | 4/2012 | Stanger Ramirez | 84/645 |
| 8,536,438 | B2 * | 9/2013 | Goto | 84/746 |
| 8,680,390 | B2 * | 3/2014 | McMillen et al. | 84/746 |
| 2004/0083877 | A1 * | 5/2004 | Bubar | 84/423 R |
| 2009/0301289 | A1 * | 12/2009 | Gynes | 84/645 |
| 2010/0064883 | A1 * | 3/2010 | Gynes | 84/645 |
| 2010/0135279 | A1 * | 6/2010 | Petersson et al. | 370/352 |
| 2011/0271821 | A1 * | 11/2011 | McKinney et al. | 84/746 |
| 2011/0303077 | A1 * | 12/2011 | Vinciguerra | 84/746 |
| 2013/0068086 | A1 * | 3/2013 | Mittelstadt et al. | 84/645 |

* cited by examiner

*Primary Examiner* — Jeffrey Donels

(74) *Attorney, Agent, or Firm* — Trellis IP Law Group, PC

(57) ABSTRACT

Embodiments generally relate to processing music. In one embodiment, a system includes a base and one or more structures coupled to the base, where the one or more structures form one or more respective bays in the base. The system also includes one or more input/output (I/O) modules configured to be removably received into the one or more bays, where the one or more I/O modules are operable to provide control information.

12 Claims, 15 Drawing Sheets

200

200

1500

BASE FOR TABLET COMPUTER PROVIDING INPUT/OUPUT MODULES

BACKGROUND

The creation of music is a popular activity enjoyed by many people. Various devices may be used to enable a user to create music. For example, a user may connect a musical instrument such as a piano keyboard to a computer system. This enables the user to create music using the keyboard and record the music on the computer system. The user may connect various other devices such as speakers to a keyboard and/or computer system.

SUMMARY

Embodiments generally relate to processing music. In one embodiment, a system includes a base and one or more structures coupled to the base, where the one or more structures form one or more respective bays in the base. The system also includes one or more input/output (I/O) modules configured to be removably received into the one or more bays, where the one or more I/O modules are operable to provide control information.

In another embodiment, a system includes a base and one or more structures coupled to the base, where the one or more structures form one or more respective bays in the base. The system also includes one or more I/O modules configured to be removably received into the one or more bays, where the one or more I/O modules are operable to provide control information, and where at least one I/O module includes one or more of at least one knob, at least one slider, and at least one button.

In another embodiment, a method includes providing a base. The method also includes providing one or more structures coupled to the base, where the one or more structures form one or more respective bays in the base. The method also includes providing one or more I/O modules configured to be removably received into the one or more bays, where the one or more I/O modules are operable to provide control information.

DETAILED DESCRIPTION OF EMBODIMENTS

Embodiments described herein enable a user to create and process music by providing convenient input/output (I/O) modules. In various implementations, a system used for creating and processing music includes a base and one or more structures coupled to the base, where the structures form respective bays in the base. In various implementations, the I/O modules are configured to be removably received into the bays, where the I/O modules are operable to provide control information (e.g., for creating and processing music).

In various implementations, the system may provide a protective cover for a tablet computer, for a musical instrument, and/or for another system having a similar base. The I/O modules are operable to communicate with a computer such as a tablet computer and/or with other I/O modules. In various implementations, one or more of the I/O modules are rearrangeable, each may include one or more knobs, sliders, and/or buttons.

As a result, the user has the experience of creating and processing music using convenient I/O modules. Embodiments enable the user to control music variables using various I/O modules. Embodiments also enable the user to conveniently reconfigure the controls of a given device using the I/O modules.

Figure 1:
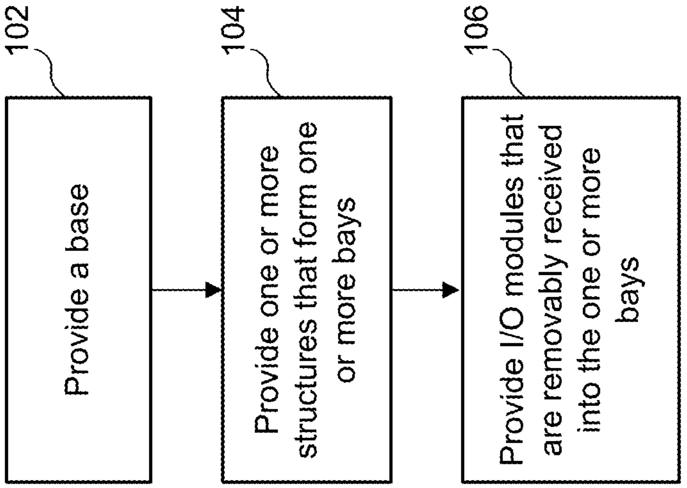
FIG. 1 illustrates an example simplified flow diagram for providing a music apparatus for creating and processing music, according to some embodiments.

FIG. 1 illustrates an example simplified flow diagram for providing a music apparatus for creating and processing music, according to some embodiments. In various implementations, a method is initiated in block 102 where a base is provided in the music apparatus. In block 104, one or more structures are provided that couple to the base, where the one or more structures form one or more respective bays in the base. In block 106, one or more I/O modules are provided and configured to be removably received into the one or more bays, where the one or more I/O modules are operable to provide control information. The base, structures, and I/O modules are described in more detail below in various example implementations.

In various implementations, the system provides a protective cover for a tablet computer. Also, the one or more I/O modules are enabled to communicate with a computer and/or with other I/O modules. These features are also described in more detail below in various example implementations.

Figure 2:
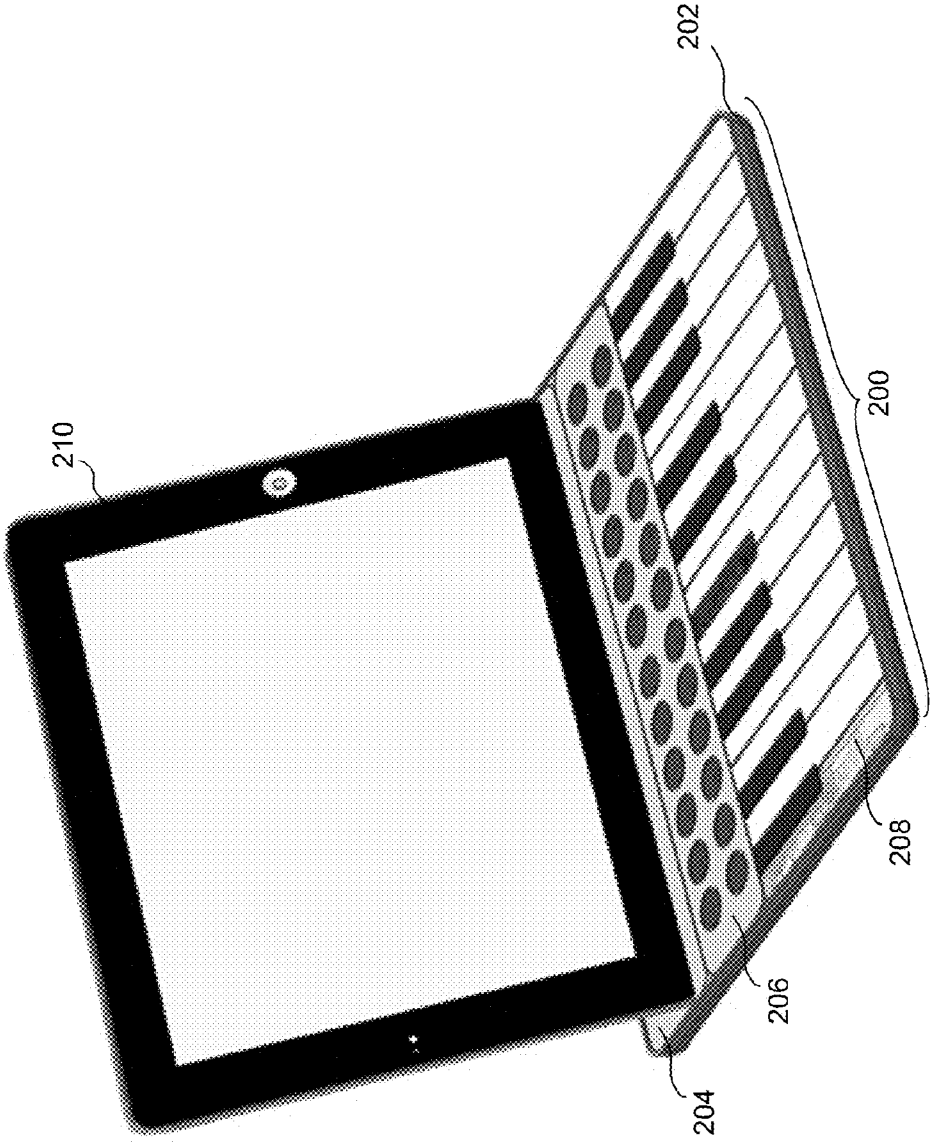
FIG. 2 illustrates an example music apparatus in an open state, according to some embodiments.

FIG. 2 illustrates an example music apparatus 200 in an open state, according to some embodiments. In various implementations, music apparatus 200 is a system for creating and processing music. As shown, music apparatus 200 includes a base 202. In various implementations, one or more structures are coupled to the base. An example bay is shown and described below in connection with FIG. 7. The one or more structures form one or more respective bays in the base.

In various implementations, the bays are configured to receive a variety of components referred to herein as I/O modules. As shown in this particular implementation, example I/O modules may include a mount module 204, a knob module 206, and a keyboard module 208. Mount module 204 is an example of an I/O module that functions to mount an external device such as a tablet computer 210, or any other device such as a smart phone, display, etc. Knob module 206 is an example of an I/O module that functions to control music or sound variables. As shown, knob module 206 includes an array of knobs, which may be arranged in any predetermined configuration. The particular configuration or layout will depend on the specific implementation. Keyboard module 208 is an example of an I/O module that functions as a musical instrument. These I/O modules and others are described in more detail below.

Figure 3:
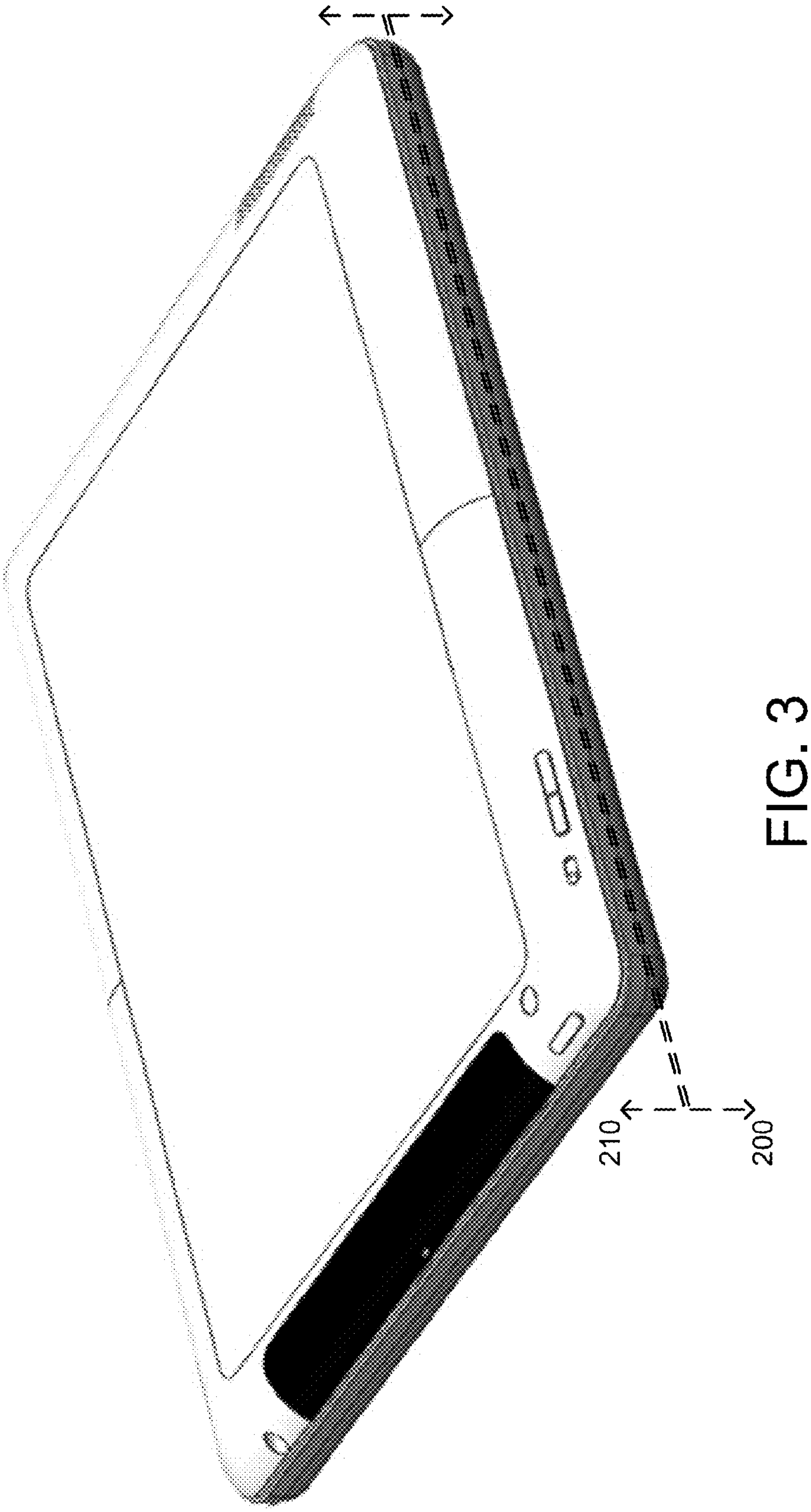
FIG. 3 illustrates music apparatus of FIG. 2 in a closed state, according to some embodiments.

FIG. 3 illustrates music apparatus 200 of FIG. 2 in a closed state, according to some embodiments. As shown, in the closed state, music apparatus 200 may be configured to function as a protective cover for tablet computer 210. As shown, in the closed state, the backside of tablet computer 210 faces outward away from music apparatus 200, while the display side faces inward toward music apparatus 200. Similarly, the backside of music apparatus 200 faces outward away from tablet computer 210, while the side of music apparatus 200 exposing the I/O modules faces inward toward the display side of tablet computer 210.

In various implementations, music apparatus 200 may be configured to enable tablet computer 210 to function as a protective cover for music apparatus 200. In some implementations, two music apparatus may be configured to connect together, such that each music apparatus provides a protective cover for the other music apparatus. Because a given music apparatus may include an I/O module that is a musical instrument, music apparatus 200 may be configured to function as a protective cover for a musical instrument. In various implementations, to provide such protective covers, the dimensions and/or perimeter size of music apparatus 200 (its base) would be similar to or substantially identical to that of the other device to which it connects. For example, music apparatus 200 and the other device to which music apparatus 200 is connected may both have a similar or the same type of base (e.g., same size/dimensions, etc.).

Figure 4:
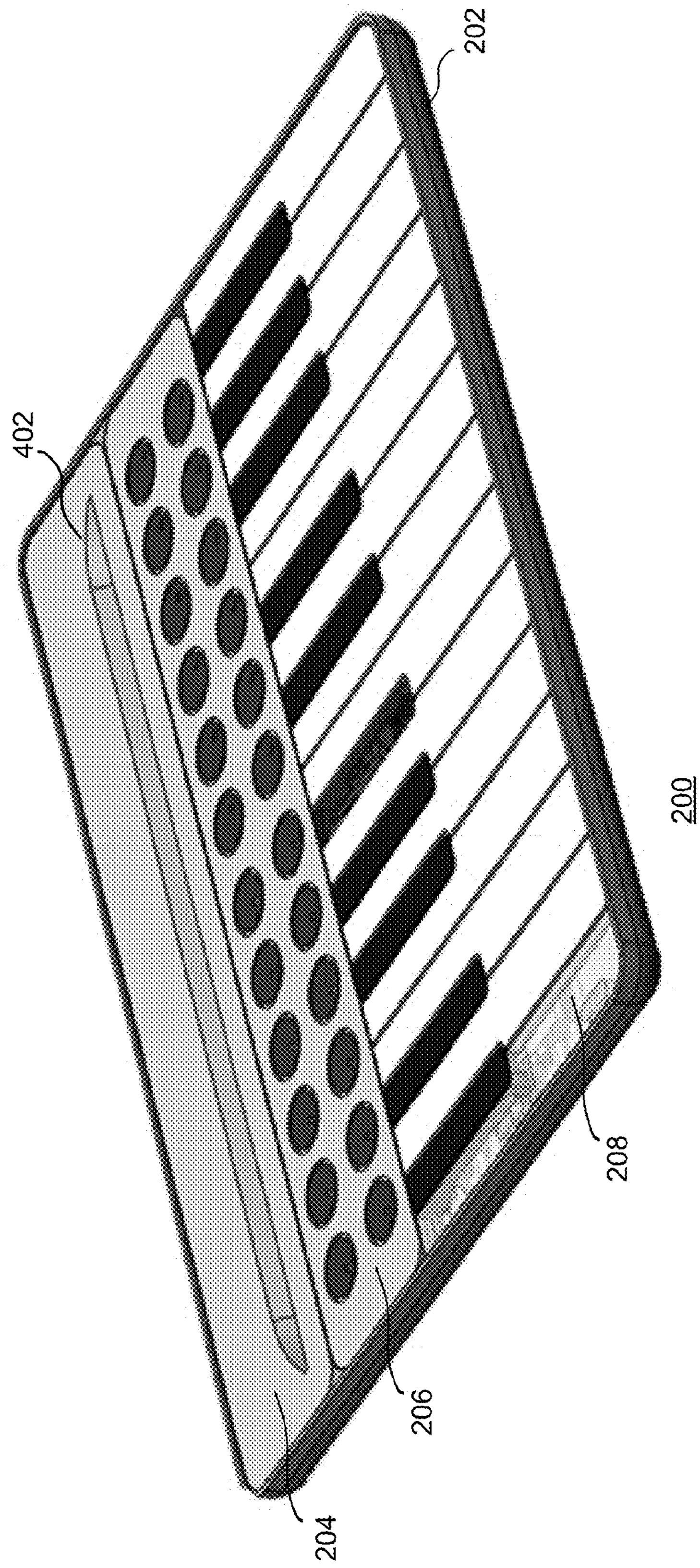
FIG. 4 illustrates music apparatus without a device mounted, according to some embodiments.

FIG. 4 illustrates music apparatus 200 without a device mounted (e.g., without tablet computer 210 mounted), according to some embodiments. As shown, mount module 204 includes a slot 402 for mounting a device such as tablet computer 210. In this particular implementation, a user may insert a device into slot 402. Slot 402 is described in more detail below in connection with FIG. 5.

As shown, music apparatus 200 is in a stored or collapsed/recessed state in that the knobs of knob module 206 and the keys of keyboard module 208 are recessed such that they are flush with the top of base 202. Such a stored/recessed state enables music apparatus 200 to be stored and/or be covered by a protective cover.

In various implementations, each I/O module has a user interface, and is operable to communicate with a computer (e.g., computer system 1500 described below in connection with FIG. 15, tablet computer 210, etc.) or with one or more other I/O modules. As such, a given user may interact with the computer, tablet computer, and/or other I/O modules via the user interface of a given I/O module. Such communications may be achieved either via a wired connection via terminals in a bay, or wirelessly via any suitable wireless means (e.g., Bluetooth, Wi-Fi, infrared (IR), etc.), or a combination of both wired and wireless connections.

Figure 5:
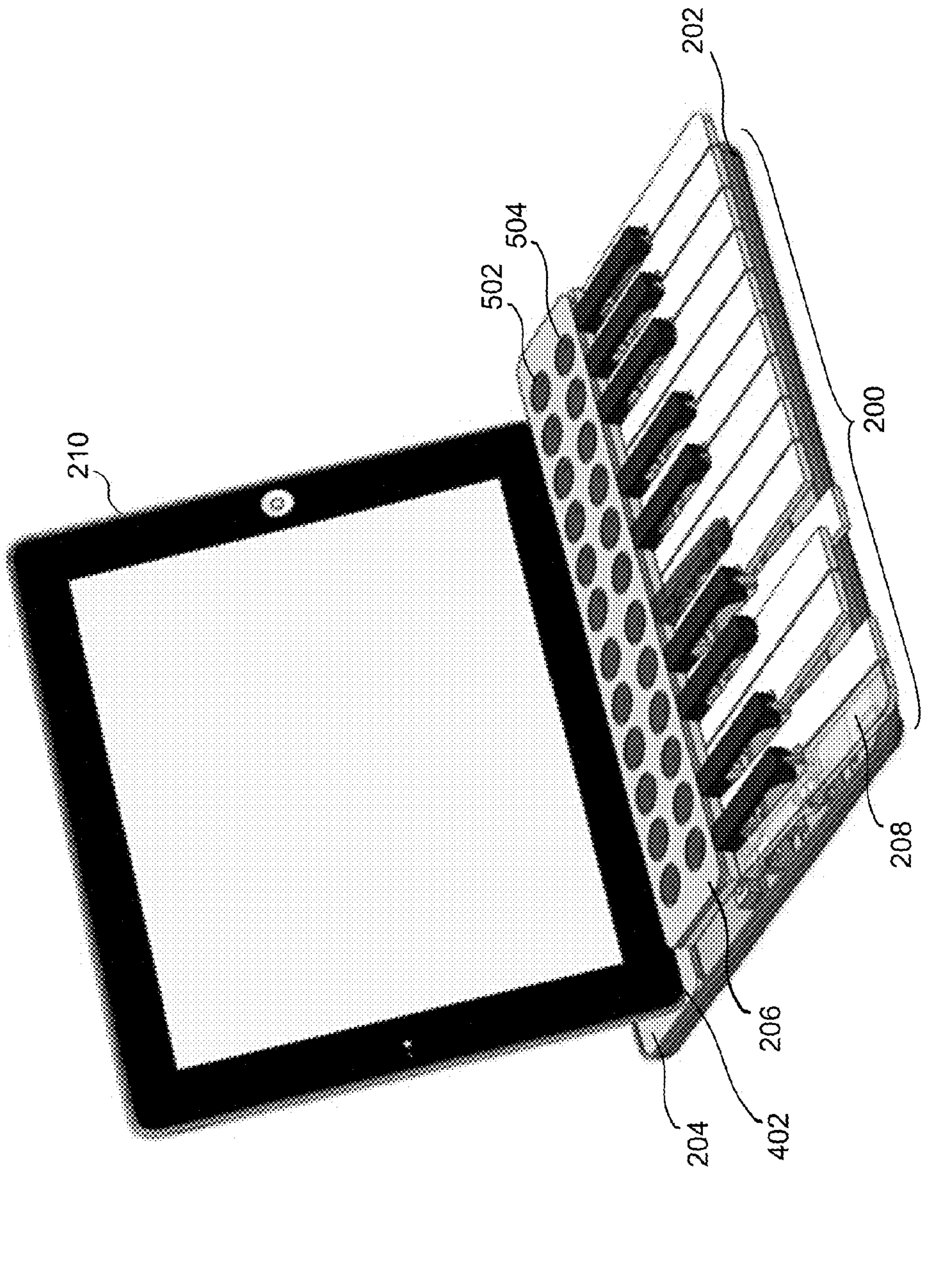
FIG. 5 illustrates music apparatus and tablet computer in an open state and in a deployed state, according to some embodiments.

FIG. 5 illustrates music apparatus 200 and tablet computer 210 in an open state and in a deployed state, according to some embodiments. In various implementations, slot 402 may be configured such that when slot 402 receives the device, slot 402 props the device up as a predetermined angle (e.g., 45°, 55°, 65°, 75°, 85°, etc.), as shown.

In some implementations, a given I/O module such as knob module 206 may be deployed such that the I/O module elevates relative to the top of base 202. In this particular implementation, knob module 206 may be elevated a predetermined distance from a predetermined point, depending on the specific implementation. For example, in some implementations, the distance may be an absolute distance above the top of base 202 (e.g., 0.25 cm, 0.5 cm, 1 cm, etc.). In some implementations, the distance may be a relative distance from a predetermined point (e.g., 0 cm, 0.25 cm, 0.5 cm, etc., above the top-most level of keys of keyboard module 208, etc.). In various implementations, a given I/O module may be elevated by any suitable mechanism. For example, the structure that forms a given bay may elevate up and down thereby elevating the I/O module that sits in the elevated bay.

In some implementations, a given I/O module such as knob module 206 may have controls (e.g., physical knobs 502, 504, etc.) that pop up when deployed. For example, in some implementations, the knobs (e.g., knobs 502, 504, etc.) may all pop up automatically when knob module 206 is deployed. In some implementations, the knobs (e.g., knobs 502, 504, etc.) may each pop up independently when the user depresses a single button. In some implementations, the knobs (e.g., knobs 502, 504, etc.) may each pop up independently when the user depresses each one individually.

In various implementations, the one or more I/O modules are operable to communicate with a computer. For example, knob module 206 and keyboard module 208 may be operable to communicate with tablet computer 210, where physical knobs of knob module 206 may control virtual dials (e.g., corresponding to volume, balance, reverb, etc.) provided by a music software application on tablet computer 210. In some implementations, one or more I/O modules may be adapted to operate with specific software that is run on a computer (e.g., computer system 1500 described below in connection with FIG. 15, tablet computer 210, etc.).

As indicated above, keyboard module 208 is an I/O module that functions as a musical instrument (e.g., a piano keyboard). While the keys of keyboard module 208 are shown in a collapsed/recessed state in FIG. 4, keys of keyboard module 208 may be converted to a deployed or popped up state, as shown in FIG. 5, where a first level of keys (e.g., the black keys) elevates to a first level from a predetermined point, and second level of keys (e.g., the white keys) elevates to a second level from a predetermined point, depending on the specific implementation. For example, in some implementations, the levels may each independently elevate to absolute distances above the top of base 202 (e.g., 0.25 cm, 0.5 cm, 1 cm, etc.), where the first level (e.g., black keys) is different (e.g., higher) than the second level (e.g., white keys). In some implementations, one level (e.g., black keys) may elevate to a relative distance (e.g., 0.25 cm, 0.5 cm, 1 cm, etc.) above the other level (e.g., white keys).

In some implementations, the one or more I/O modules are operable to communicate with other I/O modules. In some implementations, the controls of a given I/O module may provide additional and/or supplemental controls to another I/O module. For example, signals from some controls (e.g., knobs 502, 504, etc.) of knob module 206 may control or influence controls (e.g., black and/or white keys) of keyboard module 208.

In another example, a pedal module (not shown) may include pedal controls. Such pedal controls may include an una corda pedal (softens notes), a sostenuto pedal (sustains only notes that are held down when the sostenuto pedal is depressed), and the sustaining (damper) pedal (moves all the dampers away from the strings enabling them to vibrate freely). In some embodiments, some I/O modules may operate separately from music apparatus 200 (e.g., may be placed on the floor). In various implementations, a given I/O module may communicate directly with another I/O module and/or with a computer such as tablet computer 210 that in turn communicates with one or more I/O modules.

In some implementations, where one or more I/O modules operate separately from music apparatus 200, such I/O modules may communicate with an I/O module such as keyboard module 208 and/or with a computer such as tablet computer 210 via a wired connection or wirelessly. As indicated above, such connections may be achieved using any suitable connection means (e.g., hard wire, Bluetooth, Wi-Fi, IR, etc.).

In various implementations, the one or more I/O modules are configured to be removably received into the one or more bays. As indicated herein, each of the one or more I/O modules is operable to provide control information (e.g., to a computer, to a tablet computer such as tablet computer 210, to another I/O module, etc.). As described in more detail below in connection with FIG. 6, knob module 206 is removed and replaced with a slider module.

Figure 6:
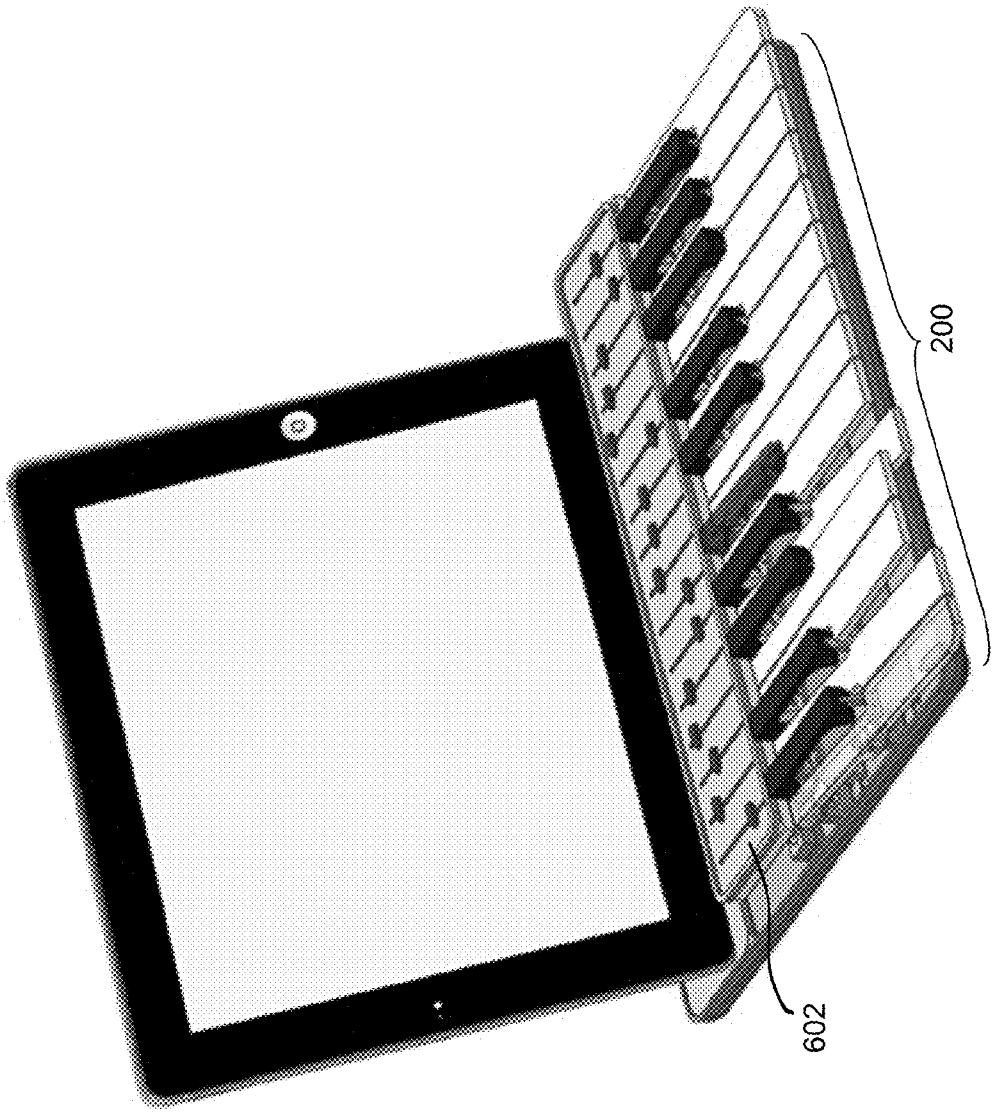
FIG. 6 illustrates music apparatus with a slider module, according to some embodiments.

FIG. 6 illustrates music apparatus 200 with a slider module 602, according to some embodiments. As shown, slider module 602 includes an array of sliders, which may be arranged in any predetermined configuration. The particular configuration or layout will depend on the specific implementation.

Figure 7:
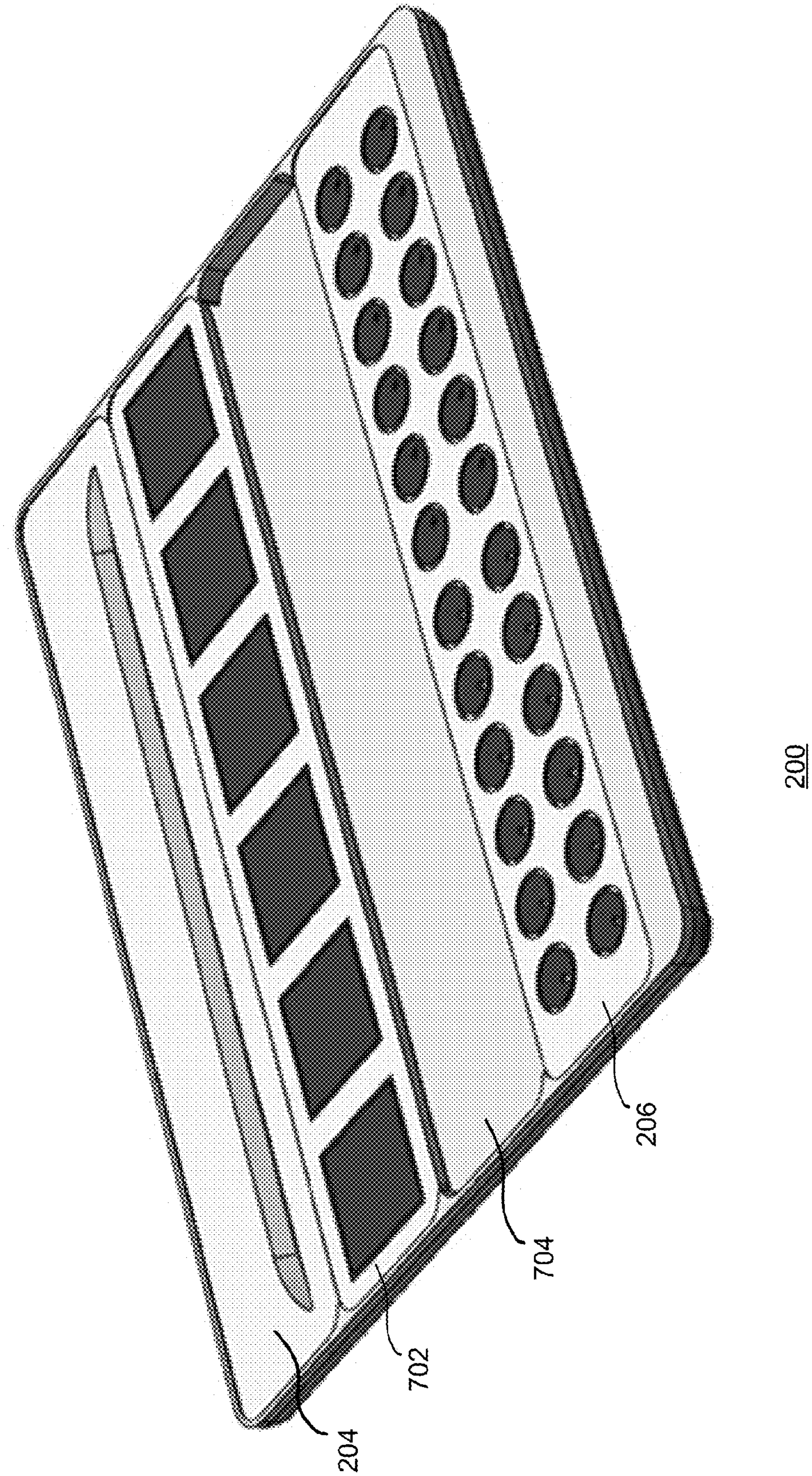
FIG. 7 illustrates music apparatus with a button module and an empty bay, according to some embodiments.

FIG. 7 illustrates music apparatus 200 with a button module 702 and an empty bay 704, according to some embodiments. As indicated above, one or more I/O modules may be configured to be removably received into the one or more bays such as bay 704. In various implementations, the bays may also be referred to as docking bays, tray bays, receptacles, etc. In this particular implementation shown in FIG. 7, music apparatus 200 has four bays (only bay 702 can be seen, as the other three bays are filled with mount module 204, button module 702, and knob module 206). In various implementations, there may be any number of bays, depending on the specific implementation.

In various implementations, a given bay may expand or contract to accommodate different sized I/O modules (e.g., deeper I/O modules such as a keyboard module 208 described above, or smaller I/O modules such as a knob module 206 described above).

As shown in FIG. 7, button module 702 includes an array of buttons, which may be arranged in any predetermined configuration. The particular configuration or layout will depend on the specific implementation. In various implementations, the buttons may be of various types (e.g., pressure-sensitive buttons, drum pads, etc.).

In various implementations, a given I/O module may be inserted into a bay and held in place by any suitable mechanism (e.g., mechanical fastening mechanism, magnetic mechanism, etc.).

In various implementations, each I/O module may be electrically charged using batteries (e.g., regular batteries, rechargeable batteries, etc.). In some implementations, each I/O module may be electrically charged via a bay and/or via any suitable conductive and/or inductive method.

In various implementations, a given I/O module may include one or more of a variety of electrical interfaces (e.g., USB connections, MIDI interface, etc.).

Figure 8:
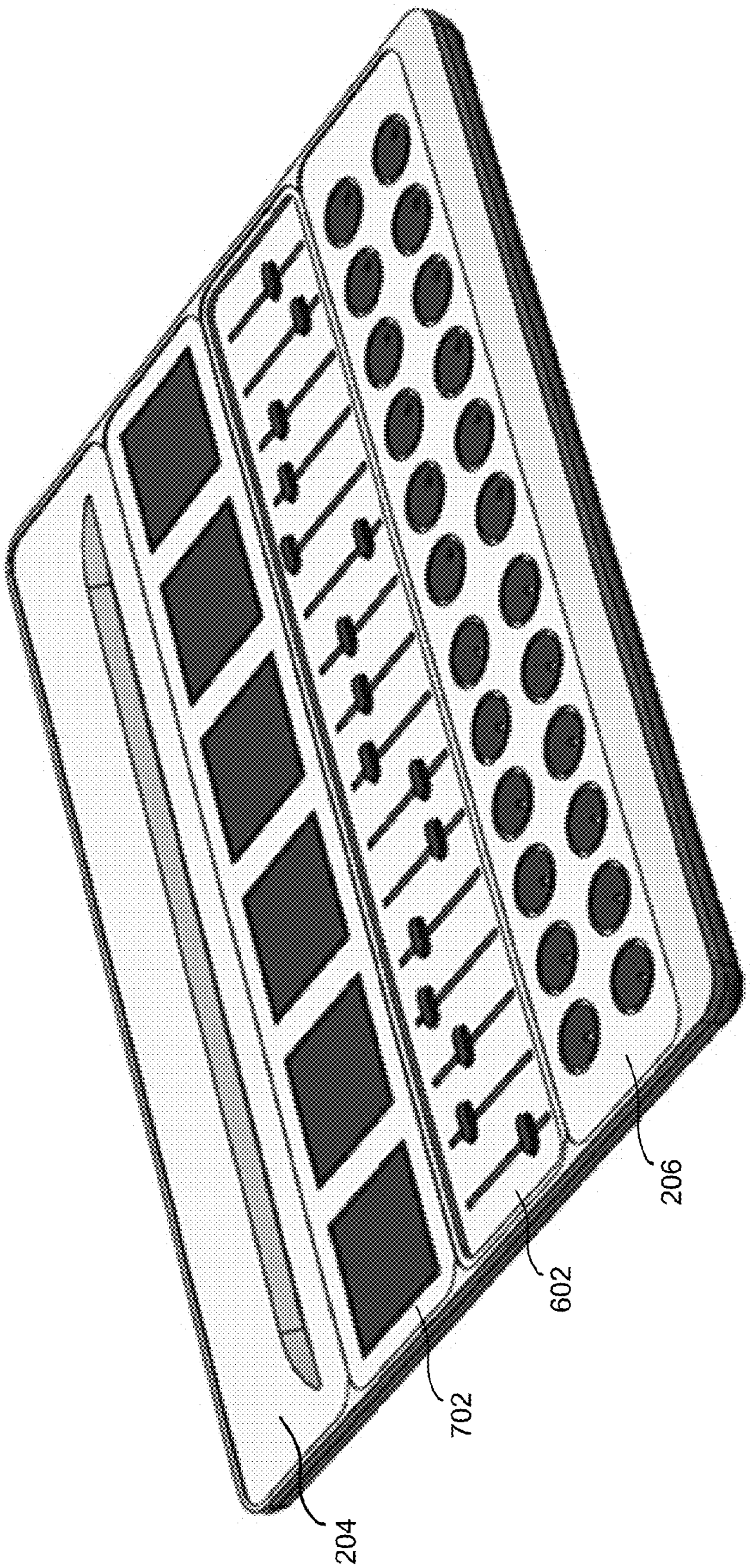
FIG. 8 illustrates music apparatus with mount module, button module, slider module, and knob module, according to some embodiments.

FIG. 8 illustrates music apparatus 200 with mount module 204, button module 702, slider module 602, and knob module 206, according to some embodiments. For ease of illustration, some I/O modules shown each have one type of physical control element. For example, button module 702 includes buttons, slider module 602 includes sliders, and knob module 206 includes knobs. In various implementations, any given I/O module may have any combination of types of controls. For example, a given I/O module may have a combination of one or more of buttons, sliders, knobs, pedals, etc., as well as other types of physical control elements. In other words, in various implementations, a given I/O module may include one or more of at least one knob, at least one slider, and at least one button.

In some implementations, one or more I/O modules may be configured such that the controls are rearrangeable by the user. For example, in some implementations, a given I/O module may be configured such that the user may add and/or remove individual physical control elements (e.g., buttons, sliders, knobs, pedals, etc.) to and/or from that I/O module.

Furthermore, a given I/O module may be configured to include various electrical interfaces. For example, in various implementations, a given I/O module may include any combination of one or more of a control voltage interface, a universal serial bus (USB) interface, etc., as well as any other type of electrical interface.

Figure 9:
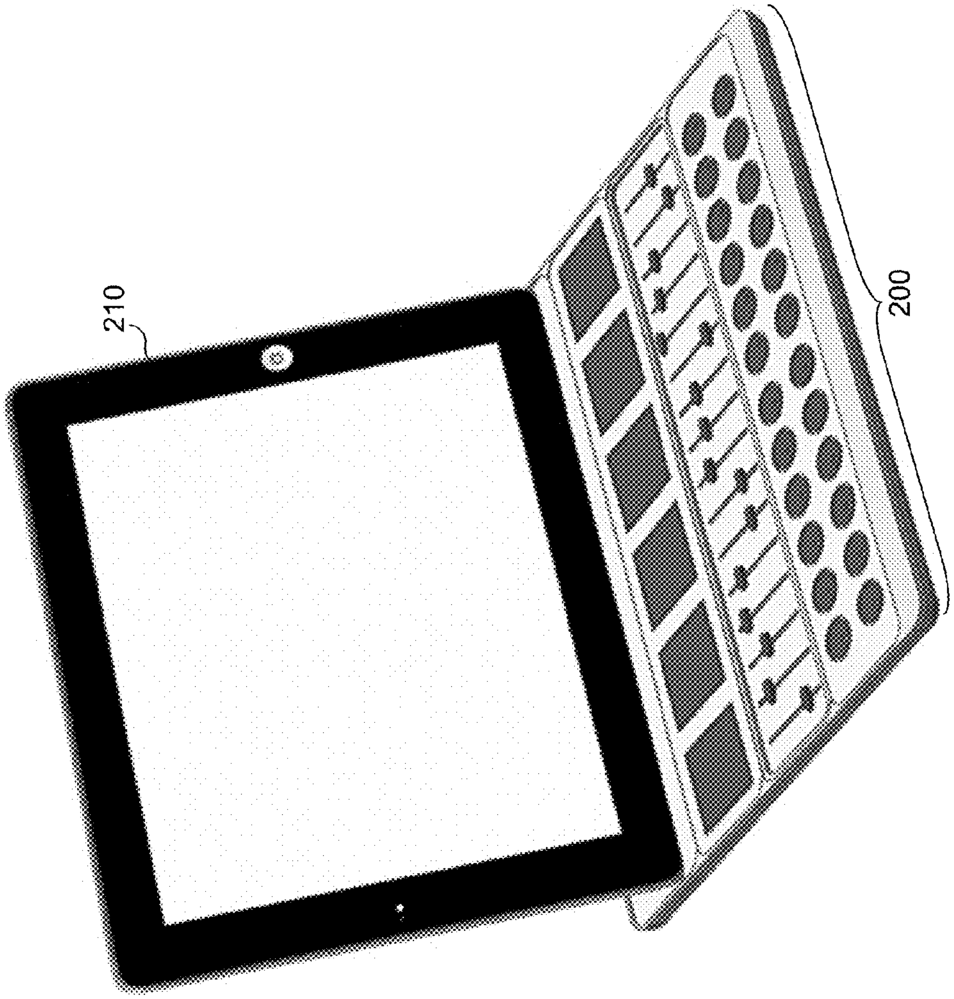
FIG. 9 illustrates music apparatus as configured in FIG. 8 with a tablet computer, according to some embodiments.

FIG. 9 illustrates music apparatus 200 as configured in FIG. 8 with tablet computer 210, according to some embodiments. As indicated above, one or more I/O modules may be operable even when removed from a bay. For example, an I/O module may be held in the hand of a user or may be set on a table top, placed on the floor, etc. In various implementations, a given I/O module may be operable with one or more computers such as tablet computer 210 even when attached to a different music apparatus. Example implementations of multiple, combined music apparatus are described in detail below in connection with FIGS. 10, 11, 12, 13, and 14.

Figure 10:
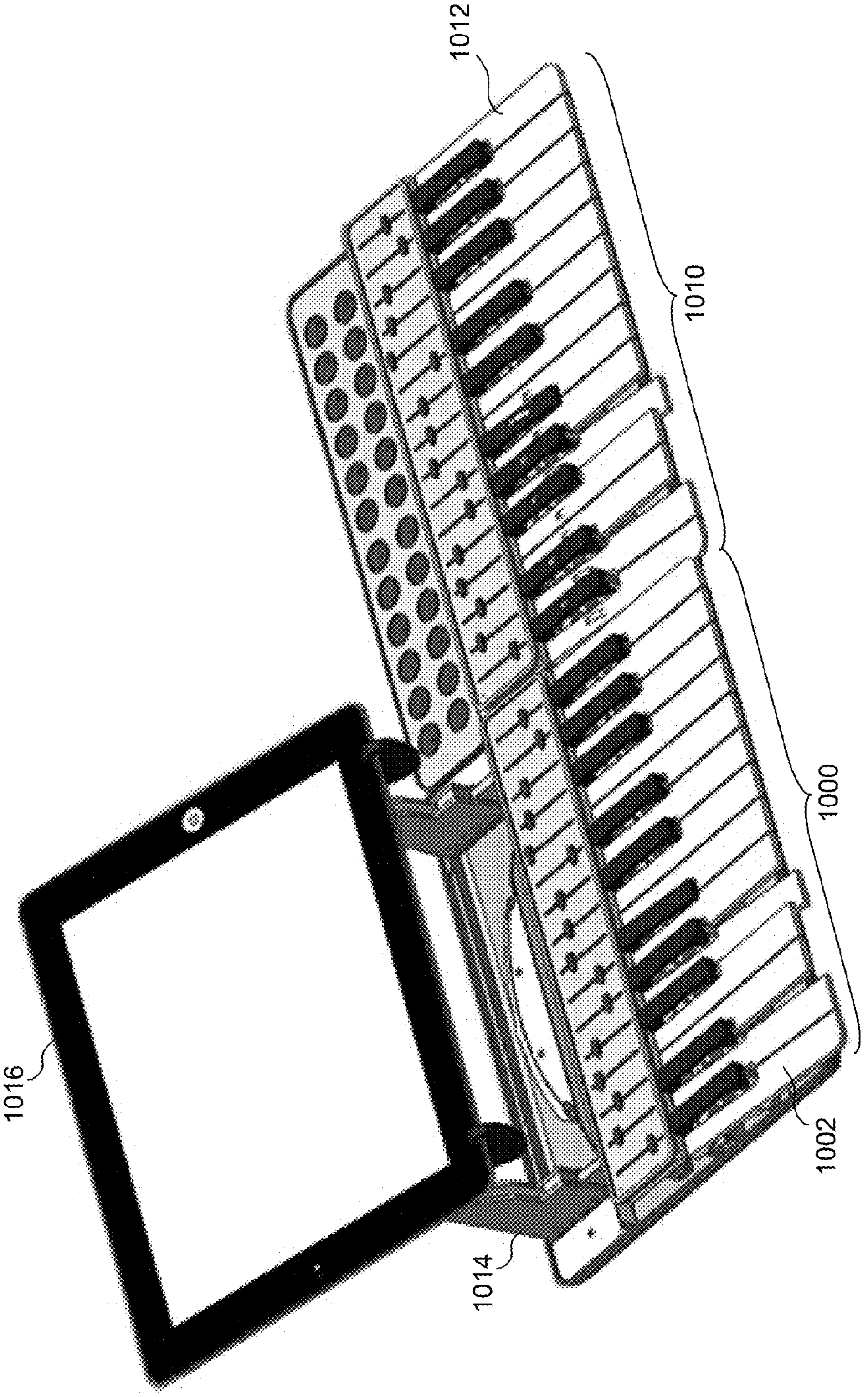
FIG. 10 illustrates two music apparatus positioned in series, according to some embodiments.

FIG. 10 illustrates two music apparatus 1000 and 1010 positioned in series, according to some embodiments. As shown, music device 1000 includes a keyboard module 1002, and music device 1010 includes a keyboard module 1012, where keyboard modules 1002 and 1012 are daisy-chained. As such, the user may operate the keys of keyboard modules 1002 and 1012 together to provide an effectively larger keyboard with more keys. In other words, music apparatus 1000 and 1010 may function together as a single music apparatus (e.g., a single keyboard which may provide a larger range of keys).

Also shown is a mount module 1014 that elevates a tablet computer 1016. In various implementations, mount module 1014 may elevate tablet computer 1016 using any suitable mechanism. The mechanism may position tablet computer 1016 at any predetermined position (e.g., height) and at any predetermined angle (e.g., 45°, 55°, 65°, 75°, 85°, etc.), as shown.

Figure 11:
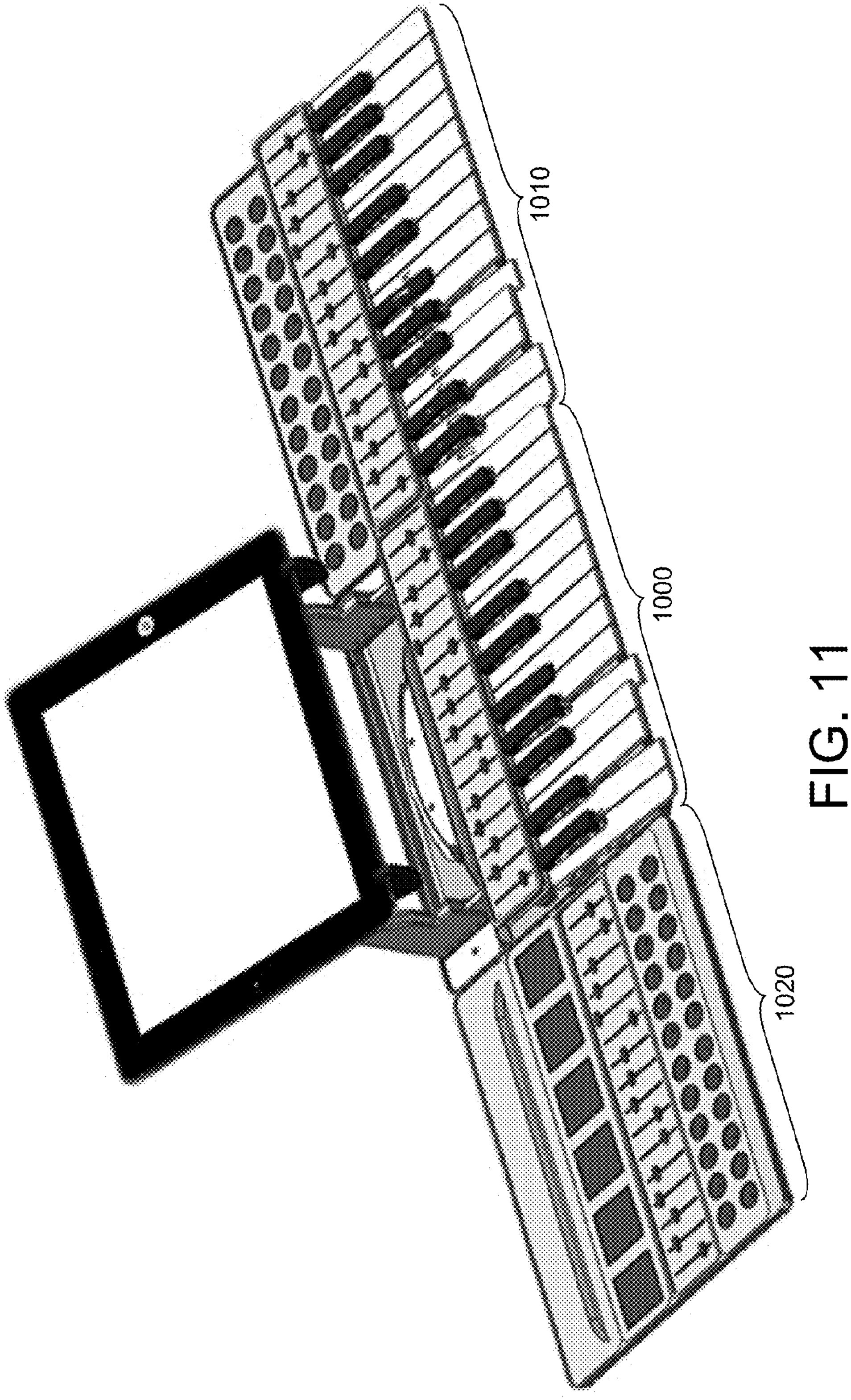
FIG. 11 illustrates three music apparatus positioned in series, according to some embodiments.

FIG. 11 illustrates three music apparatus 1000, and 1010, and 1020 positioned in series, according to some embodiments. As shown, the combination of music apparatus 1000 and 1010 is similar to that shown in FIG. 10, and music apparatus 1020 has a similar configuration to that of FIG. 8. In this particular example implementation, music apparatus 1000 and 1010 may function together as a single music apparatus (e.g., a single keyboard), and music apparatus 1020 may function as a disc jockey mixer or other music device.

Figure 12:
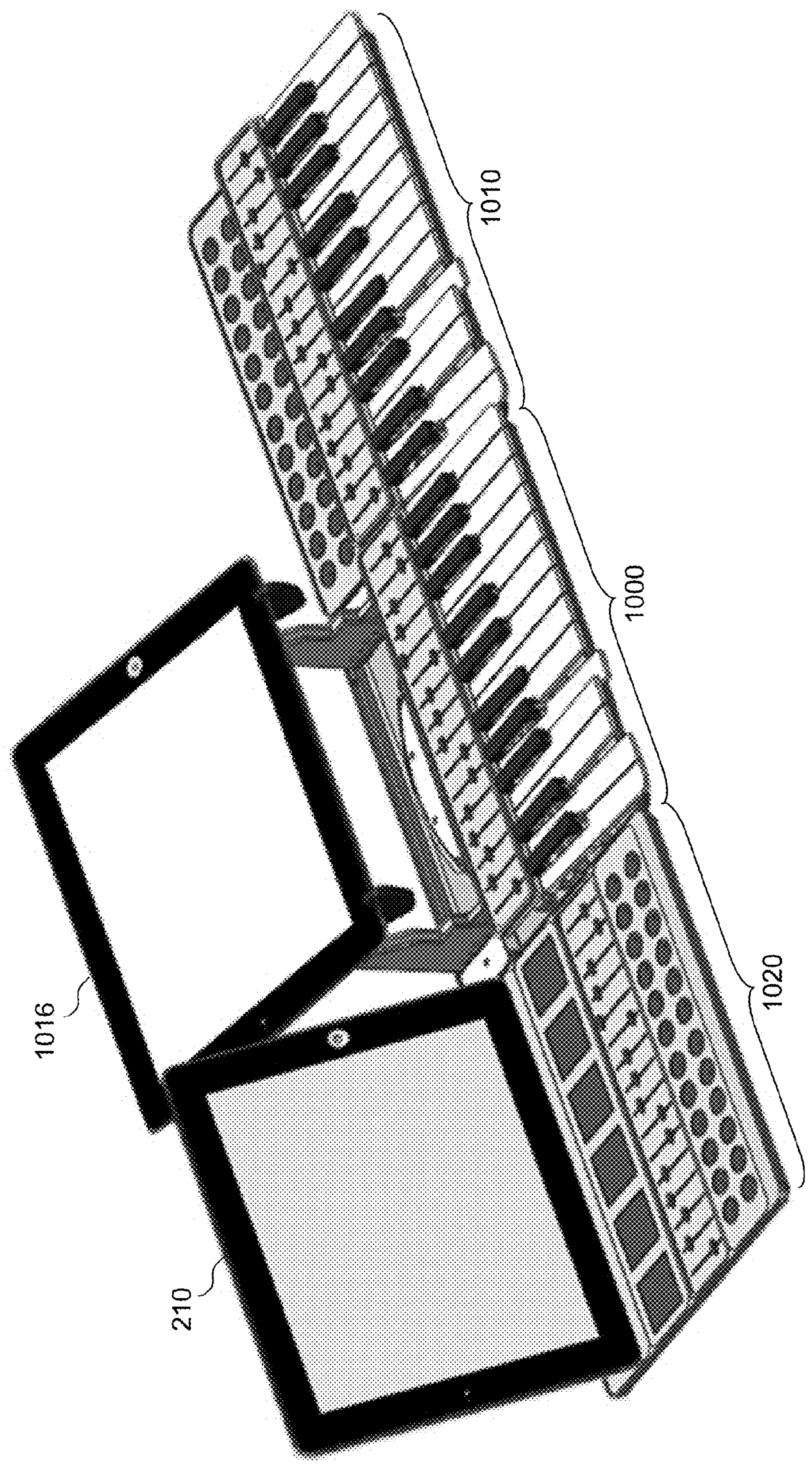
FIG. 12 illustrates three music apparatus positioned in series, each with a tablet computer, according to some embodiments.

FIG. 12 illustrates three music apparatus 1000, and 1010, and 1020 positioned in series, and with two tablet computers 210 and 1016, according to some embodiments. As shown, music apparatus 1000 and 1010 are similar to those shown in FIG. 10, and music apparatus 1020 has a similar configuration to that shown in FIG. 11, except that music apparatus 1020 of FIG. 12 has tablet computer 210 attached. In this particular example implementation, music apparatus 1000 and 1010 may function together as a single music apparatus (e.g., a single keyboard), and music apparatus 1020 may function as a disc jockey mixer or other music device.

Figure 13:
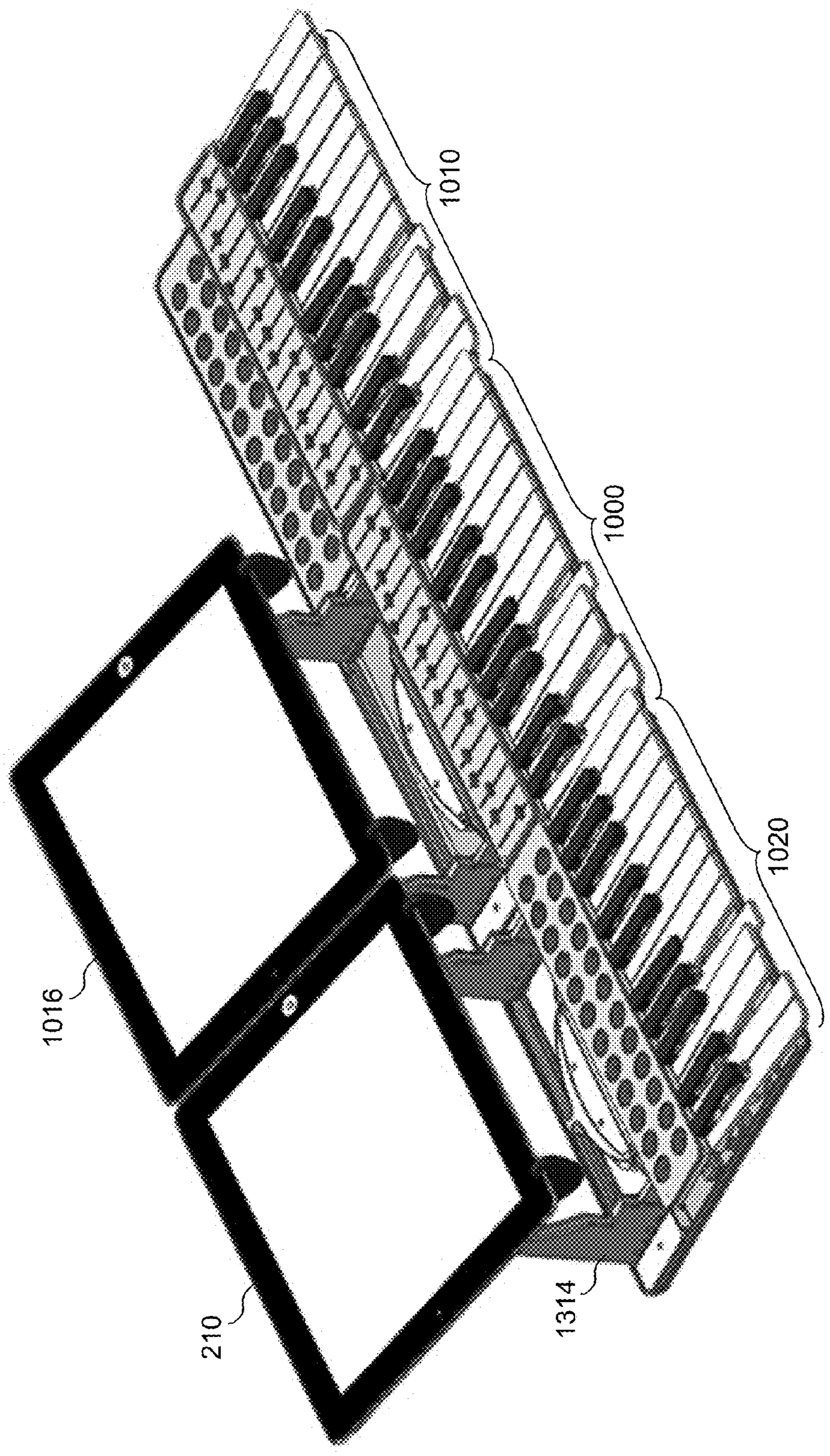
FIG. 13 illustrates three music apparatus positioned in series, each with a tablet computer, according to some embodiments.

FIG. 13 illustrates three music apparatus 1000, and 1010, and 1020 positioned in series, and with two tablet computers 210 and 1016, according to some embodiments. Music apparatus 1000, and 1010, and 1020 shown in FIG. 13 are configured similarly to music apparatus 1000, and 1010, and 1020 of FIG. 12, except that music apparatus 1020 of FIG. 13 has a mount module 1314 similar to mount module 1014 of FIG. 10 (instead of a mount module similar to mount module 204 of FIG. 8).

Figure 14:
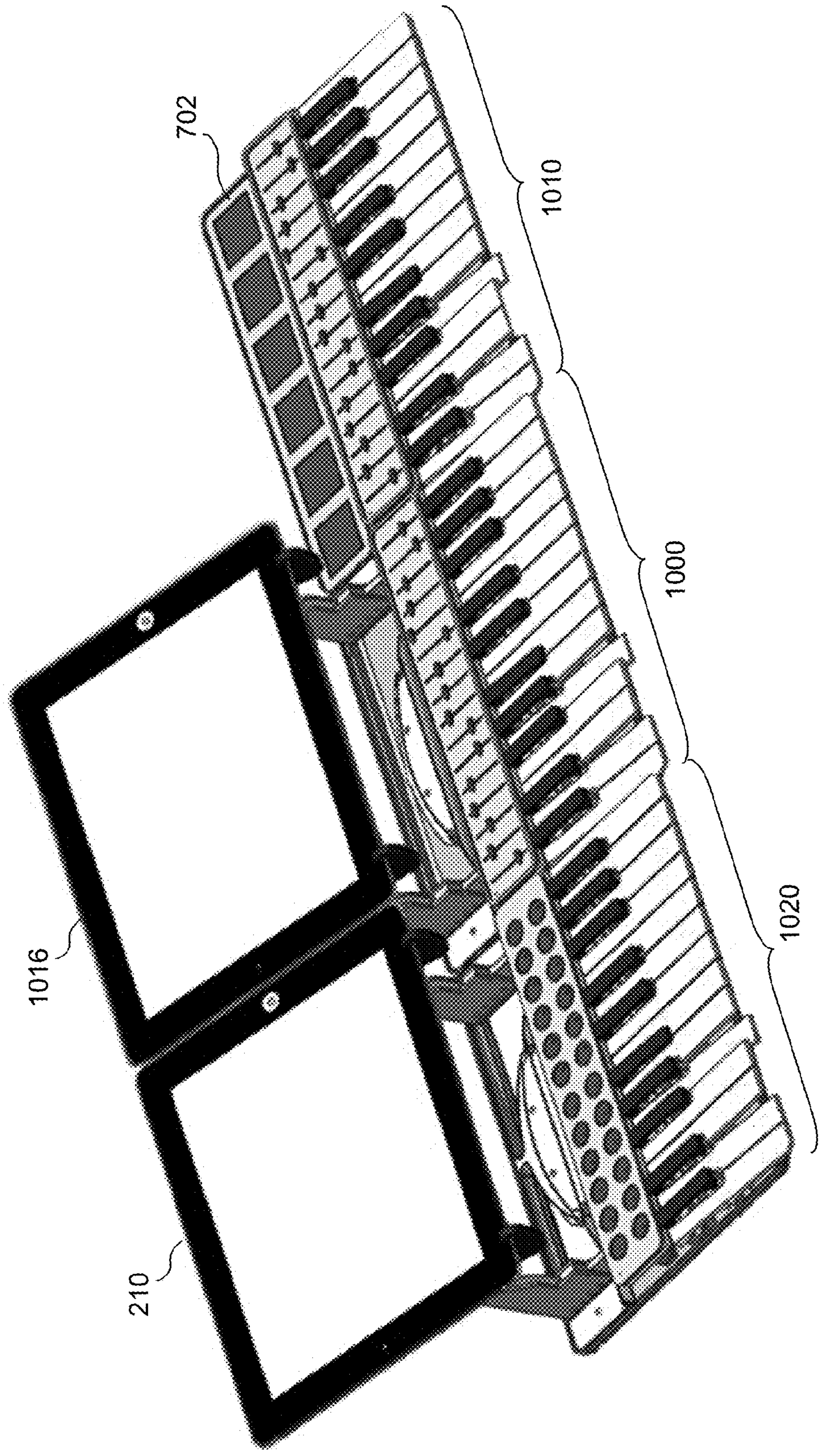
FIG. 14 illustrates three music apparatus positioned in series, each with a tablet computer, according to some embodiments.

FIG. 14 illustrates three music apparatus 1000, and 1010, and 1020 positioned in series, and with two tablet computers 210 and 1016, according to some embodiments. Music apparatus 1000, and 1010, and 1020 shown in FIG. 14 are configured similarly to music apparatus 1000, and 1010, and 1020 of FIG. 13, except that music apparatus 1010 of FIG. 14 has button module 702 instead of a slider module.

Embodiments described herein provide various benefits. For example, embodiments enable professional and non-professional musicians to quickly and conveniently control music variables using various I/O modules. Embodiments also enable the user to conveniently reconfigure the controls of a given device using the I/O modules.

Figure 15:
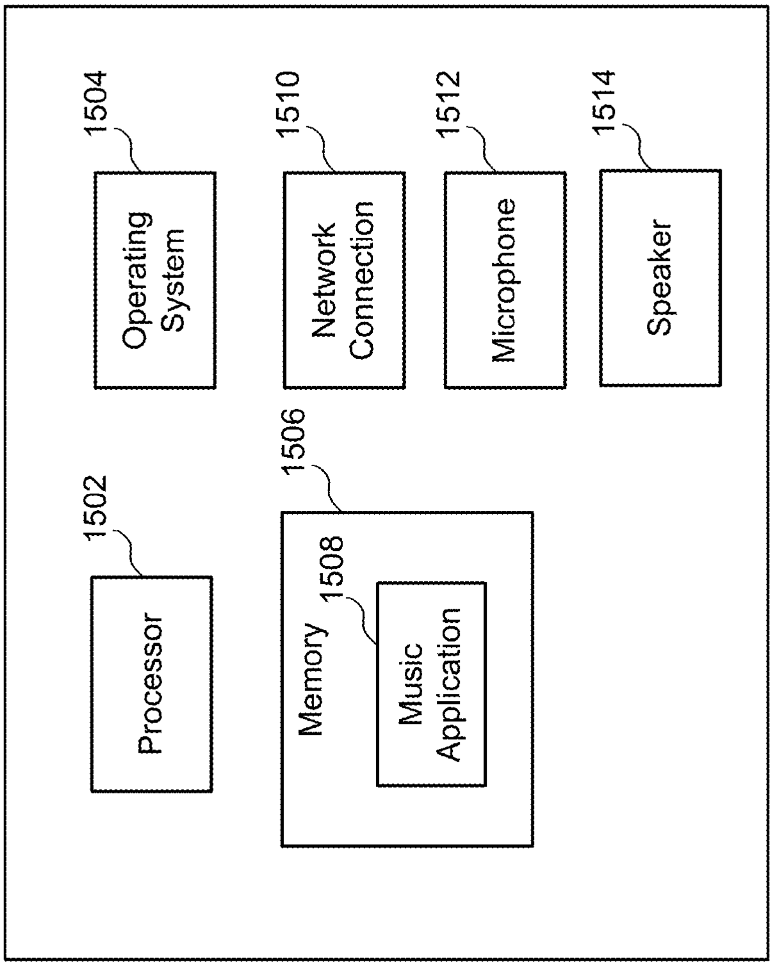
FIG. 15 is a block diagram of an example computer system, which may be used to implement the embodiments described herein.

FIG. 15 is a block diagram of an example computer system 1500, which may be used to implement the embodiments described herein. In some embodiments, computer system 1500 may include a processor 1502, an operating system 1504, a memory 1506, a music application 1508, a network connection 1510, a microphone 1512, and a speaker 1514. For ease of illustration, the blocks shown in FIG. 15 may each represent multiple units. In other embodiments, system 1500 may not have all of the components shown and/or may have other elements including other types of elements instead of, or in addition to, those shown herein.

In various implementations, computer system 1500 may represent a computer system that resides in any one or more I/O modules, or in any other computer system that communicates with one or more I/O modules.

Music application 1508 may be stored on memory 1506 or on any other suitable storage location or computer-readable medium. Music application 1508 provides instructions that enable processor 1502 to perform the functions described herein. In various embodiments, music application 1508 may run on any electronic device including smart phones, tablets, computers, etc.

In some implementations, system 1500 may include an integrated touchscreen for various input/output functionality. Such a touchscreen may include any suitable interactive display surface or electronic visual display that can detect the presence and location of a touch within the display area. The touchscreen may support touching the display with a finger or hand, or any suitable passive object, such as a stylus. Any suitable display technology (e.g., liquid crystal display (LCD), light emitting diode (LED), etc.) can be employed in the touchscreen. In addition, the touchscreen in particular embodiments may utilize any type of touch detecting technology (e.g., resistive, surface acoustic wave (SAW) technology that uses ultrasonic waves that pass over the touchscreen panel, a capacitive touchscreen with an insulator, such as glass, coated with a transparent conductor, such as indium tin oxide (ITO), surface capacitance, mutual capacitance, self-capacitance, projected capacitive touch (PCT) technology, infrared touchscreen technology, optical imaging, dispersive signal technology, acoustic pulse recognition, etc.).

In various embodiments, processor 1502 may be any suitable processor or controller (e.g., a central processing unit (CPU), a general-purpose microprocessor, a microcontroller, a microprocessor, etc.). Further, operating system 1504 may be any suitable operating system (OS), or mobile OS/platform, and may be utilized to manage the operation of processor 1502, as well as to manage execution of various application software. Examples of operating systems include Android from Google, iPhone OS (iOS), Berkeley software distribution (BSD), Linux, Mac OS X, Microsoft Windows, and UNIX.

In various embodiments, memory 1506 may be used for instruction and/or data memory, as well as to store music and/or video files created on or downloaded to system 1500. Memory 1506 may be implemented in one or more of any number of suitable types of memory (e.g., static random access memory (SRAM), dynamic RAM (DRAM), electrically erasable programmable read-only memory (EEPROM), etc.). Memory 106 may also include or be combined with removable memory, such as memory sticks (e.g., using flash memory), storage discs (e.g., compact discs, digital video discs (DVDs), Blu-ray discs, etc.), and the like. Interfaces to memory 1506 for such removable memory may include a universal serial bus (USB), and may be implemented through a separate connection and/or via network connection 1510.

In various embodiments, network connection 1510 may be used to connect other devices and/or instruments to system 1500. For example, network connection 1510 can be used for wireless connectivity (e.g., Wi-Fi, Bluetooth, etc.) to the Internet (e.g., navigable via a touchscreen), or to another device. Network connection 1510 may represent various types of connection ports to accommodate corresponding devices or types of connections. For example, additional speakers (e.g., Jawbone wireless speakers, or directly connected speakers) can be added via network connection 1510. Also, headphones via the headphone jack can also be added directly, or via wireless interface. Network connection 1510 can also include a USB interface to connect with any USB-based device.

In various embodiments, network connection 1510 may also allow for connection to the Internet to enable processor 1502 to send and receive music over the Internet. As described in more detail below, in some embodiments, processor 1502 may generate various instrument sounds coupled together to provide music over a common stream via network connection 1510.

In various embodiments, speaker 1514 may be used to play sounds and melodies generated by processor 1502. Speaker 1514 may also be supplemented with additional external speakers connected via network connection 1510, or multiplexed with such external speakers or headphones.

Although the description has been described with respect to particular embodiments thereof, these particular embodiments are merely illustrative, and not restrictive. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A system comprising:

a base, wherein the base connects to a tablet computer, and wherein the base is a protective cover for the tablet computer while in a closed state;

one or more structures coupled to the base, wherein the one or more structures form one or more respective bays in the base; and one or more input/output (I/O) modules configured to be removably received into the one or more bays, wherein the one or more I/O modules are operable to provide control information, and wherein the one or more I/O modules communicate with the tablet computer via one or more electrical connections.

2. The system of claim 1, wherein the tablet computer has a similar base.

3. The system of claim 1, wherein the one or more I/O modules comprise controls that enable a user to interact with the tablet computer.

4. The system of claim 1, wherein the one or more I/O modules comprise controls that enable a user to interact with other I/O modules.

5. The system of claim 1, wherein the bays receive a variety of types of I/O modules.

6. The system of claim 1, wherein at least one I/O module includes one or more of at least one knob, at least one slider, and at least one button.

7. The system of claim 1, wherein at least one I/O module includes a musical instrument.

8. A system comprising:

a base, wherein the base connects to a tablet computer, and wherein the base is a protective cover for the tablet computer while in a closed state;

one or more structures coupled to the base, wherein the one or more structures form one or more respective bays in the base; and one or more input/output (I/O) modules configured to be removably received into the one or more bays, wherein the one or more I/O modules are operable to provide control information, and wherein at least one I/O module includes one or more of at least one knob, at least one slider, and at least one button, and wherein the one or more I/O modules communicate with the tablet computer via one or more electrical connections.

9. The system of claim 8, wherein the tablet computer has a similar base.

10. The system of claim 8, wherein the one or more I/O modules comprise controls that enable a user to interact with the tablet computer.

11. The system of claim 8, wherein the one or more I/O modules comprise controls that enable a user to interact with other I/O modules.

12. The system of claim 8, wherein the bays receive a variety of types of I/O modules.

* * * * *